D. A. PLECKER.
Harrow.
No. 219,513. Patented Sept. 9, 1879.
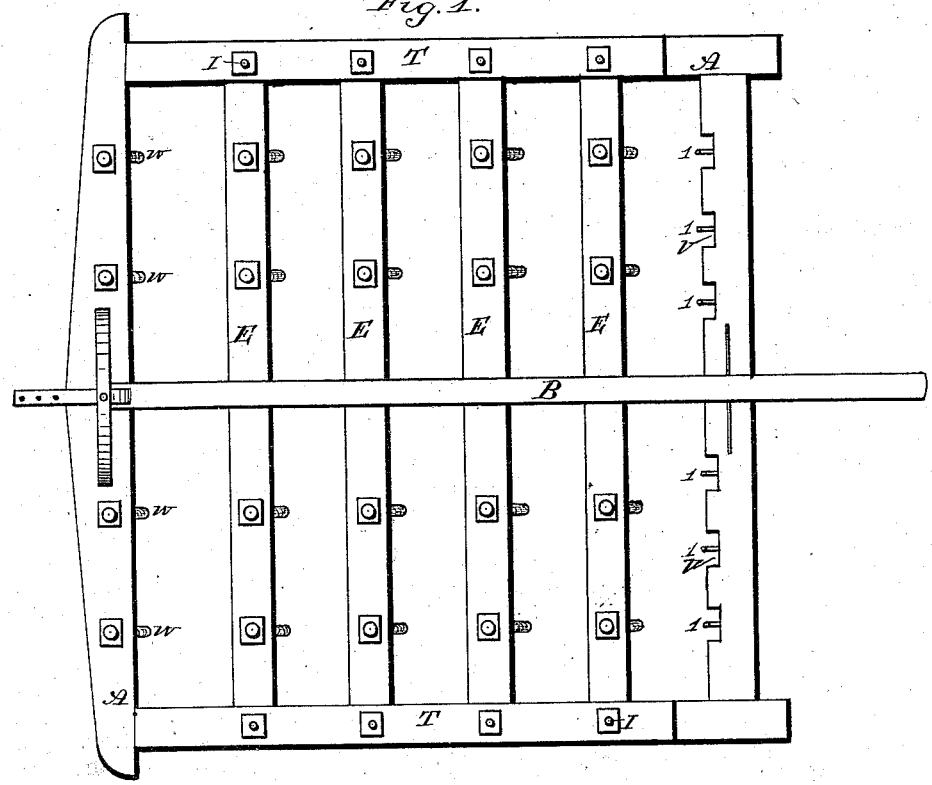
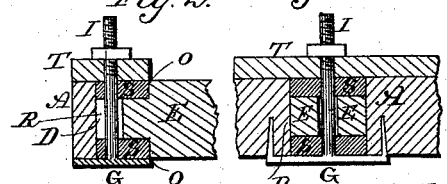
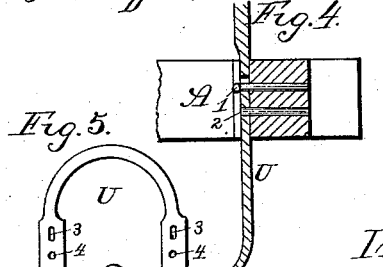
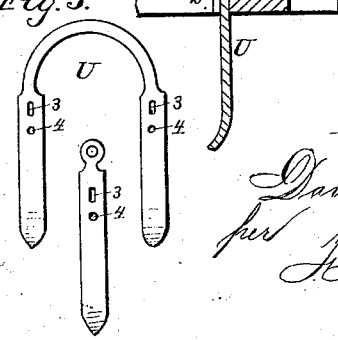
Witnesses:
J. W. Garner
W. S. D. Haines
Inventor:
David A. Plecker
per F. H. Lehmann
Atty

UNITED STATES PATENT OFFICE.

DAVID A. PLECKER, OF MOUNT CRAWFORD, VIRGINIA.

IMPROVEMENT IN HARROWS.

Specification forming part of Letters Patent No. 219,513, dated September 9, 1879; application filed July 28, 1879.

*To all whom it may concern:*

Be it known that I, DAVID A. PLECKER, of Mount Crawford, in the county of Rockingham and State of Virginia, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification.

My invention relates to an improvement in harrows; and it consists in the arrangement and combination of parts, whereby each beam to which the teeth are attached can be readily removed from the frame of the harrow, and be raised or lowered, according to the depth that it is desired that the teeth shall run, as will be more fully described hereinafter.

Figure 1 is a plan view of my invention. Figs. 2 and 3 are vertical cross-sections taken through one of the beams to which the teeth are secured. Fig. 4 is a vertical cross-section taken through the rear beam of the frame, so as to show the method of fastening a corn-marker. Fig. 5 is a front elevation of the corn-markers.

A represents a suitable rectangular frame, which may be of any suitable construction, and upon the top of this frame is secured the handle B. Upon the front beam of the frame is secured the device to which the team is fastened, and which is raised to a considerable height above the top of the beam, so that the horses can draw the harrow more easily.

It is desirable that every cross-bar of the harrow to which the teeth are attached should be made not only removable, but vertically adjustable, for the purpose of controlling the depth at which the teeth shall run. In the inner edge of each of the two side beams of the frame A are made recesses D, in which the ends of the cross-bars E are held in place.

Secured to the under side of each side beam, just under the recess to receive an end of the cross-beam, is a metallic plate, G, which has its ends so shaped that they can be driven into the under side of the beam, and thus hold the plate in position. Projecting from the top of each of these plates, up through the recess cut in the side beam of the frame, is a screw-rod, I, which is long enough to extend some distance above the top of the side beams, as shown. The end of each cross-beam has a rabbet, O, formed in the upper and lower sides of its end, and in each end is made a notch, R, so as to pass around or straddle over the sides of the screw-rod when the end of the beam is placed in position.

In order to make these bars vertically adjustable, so as to regulate the depth at which the teeth shall run, a thick heavy washer, S, may be passed down over the screw-rod, so as to raise the end of the cross-rod up a suitable distance, and then another washer is placed upon the top of the end of the bar, so as to hold the bar in place. The thickness of the washer used and the end of the beam is just equal to the thickness of the side beams of the frame. When both washers are placed underneath the end it is evident that the end will be raised as high as the top of the side beams, and when both washers are placed on top of the end of the cross-bar the cross-bar will be depressed far enough to make its teeth run a good deal deeper than when the end of the bar is placed either between the washers or upon the top of both. After the bars have been put in place, a holding-bar, T, having a hole through it for every screw-rod used, is placed upon the top of the side beam, as shown, and then a nut is screwed down upon the upper end of the screw-rod, so as to secure the holding-rod in position. Whenever it is desired to remove one of the cross-bars it is only necessary to remove the holding-rod, when the bar can be lifted out of place.

By thus making the bars removable, whenever it is desired to use the frame A for cultivating or other purposes, the bars can be readily removed, and by making the bars vertically adjustable the depth to which the teeth shall run can be regulated according to the soil which is being cultivated or the crop to be planted.

When it is desired to mark off the ground for planting corn all of the cross-beams having harrow-teeth attached to them are removed, and the arch-shaped markers U are secured in the notches or recesses formed in the rear beam of the frame. Projecting through the beam in each of these notches there is an upper hook, 1, and a lower stud or bolt, 2.

Through each prong of the corn-marker is a slot, 3, which catches over the hook 1, and a hole, 4, for catching over the stud or bolt 2.

In order to fasten the corn-markers in position it is only necessary to pass the hooks through the slots and cause the studs to pass through the holes, when the marker will be held in position without any further fastening. When it is desired to remove the marker it is only necessary to pull backward upon its upper end and then lift upward. This fastening is very cheap, simple, and effective.

When it is desired to cultivate corn, a single shovel, having a similar slot and hole through it, is fastened in the middle recess, V.

To the under side of the front beam of the frame are secured a number of cutting-bars, W, for cutting sod, trash, and other such articles, and which are made removable, so that they can be taken out of the frame whenever the cross-bars are removed.

I am aware that the teeth of a harrow have been secured to a metallic frame on top of the harrow, and that the frame is made adjustable up and down for the purpose of controlling the depth at which the teeth shall run. My teeth are secured to the cross-bars, and each cross-bar is made independently adjustable of all of the others.

Having thus described my invention, I claim—

1. In a harrow, the cross-bars having the harrow-teeth secured to them, and made vertically adjustable in the recesses in the side beams of the frame, substantially as described.

2. In combination with the side beams of the frame A, having recesses cut in their inner edges, the washers S, plates G, secured to the under sides of the beams, and screw-rods to pass up through the beams and washers, whereby the cross-bars can be adjusted up and down, substantially as described.

3. The frame A, provided with the hooks 1 and studs 2, for the purpose of fastening the corn-marker in position, substantially as set forth.

In testimony that I claim the foregoing I have hereunto set my hand this 23d day of July, 1879.

D. A. PLECKER.

Witnesses:
 F. A. LEHMANN,
 W. S. D. HAINES.